W. M. NEYLAND.
ICE CREAM FREEZER.
APPLICATION FILED MAR. 2, 1920.
1,388,055.
Patented Aug. 16, 1921.
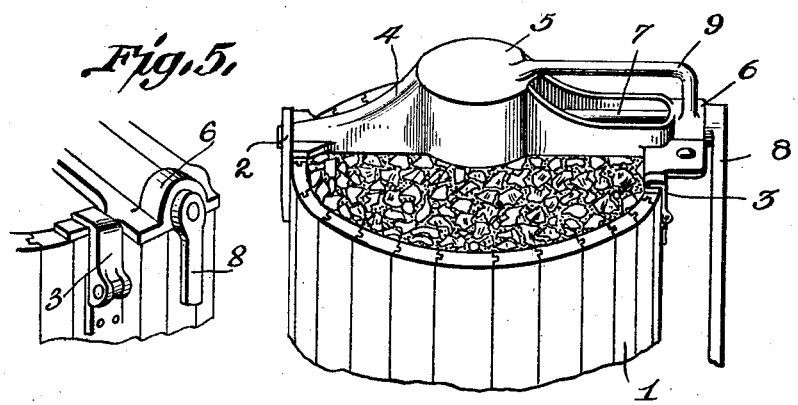
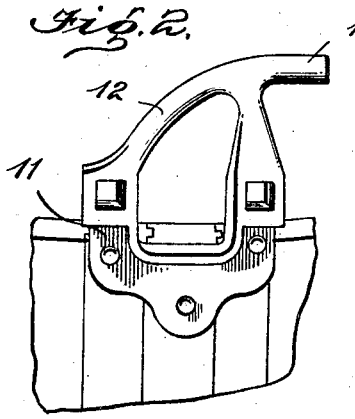
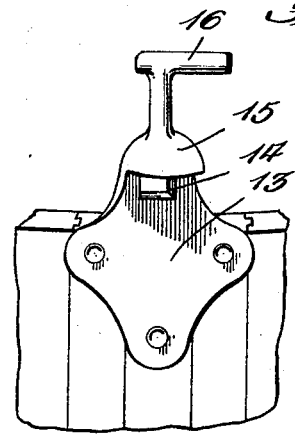
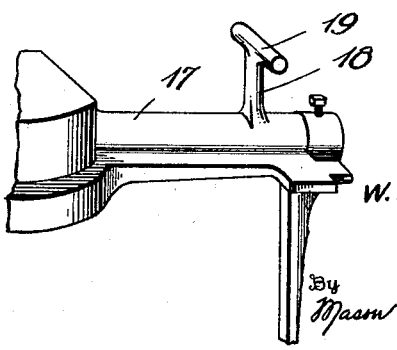
Inventor
W. M. Neyland
By Mason Fenwick & Lawrence
Attorneys

UNITED STATES PATENT OFFICE.

WILLIAM M. NEYLAND, OF GOLIAD, TEXAS.

ICE-CREAM FREEZER.

1,388,055.  Specification of Letters Patent.  Patented Aug. 16, 1921.

Application filed March 2, 1920. Serial No. 362,885.

*To all whom it may concern:*

Be it known that I, WILLIAM M. NEYLAND, citizen of the United States, residing at Goliad, in the county of Goliad and State of Texas, have invented certain new and useful Improvements in Ice-Cream Freezers; and I do hereby declare the following to be a full, clear, and exact description of the invention, such as will enable others skilled in the art to which it appertains to make and use the same.

This invention relates to new and useful improvements in ice cream freezers and more particularly to an attachment therefor.

The main object of this invention is the provision of means adapted to be integrally formed or connected with the top portion of an ice cream freezer which can be grasped by the hand of the operator for holding the freezer in a rigid position while operating the same. It is a well-known fact that in the operation of ice cream freezers, and articles of the like character, which are manually operated by means of a crank handle, the operator has a tendency to impart a jerking motion to the device and in order to eliminate this and retain the freezer or like article in a rigid position while operating the same, I have attached a handle member to the upper portion of the same, adapted to be grasped by the operator so as to retain the device in a substantially rigid position during the operation.

Another object of this invention is the provision of a handle member applied to an ice cream freezer or like article in such a manner as to enable the operator to keep his hand in a comfortable position and out of contact with the ice arranged in the freezer.

A further object of the present invention is the provision of a handle attachment for ice cream freezers or the like which is preferably attached to the crank side of the device and may be integrally formed with the metal parts of the device or attached to the body of the device itself.

With the above and other objects in view, the invention consists in the construction, the combination and arrangement of parts which will be fully pointed out in the claims and illustrated in the accompanying drawings in which, Figure 1 is a perspective view of the top portion of an ice cream freezer illustrating my improved handle applied thereto.

Fig. 2 is a detailed side elevation of a modification illustrating the handle applied to one of the fastening members.

Fig. 3 is a side elevation of another form of the invention.

Fig. 4 is a detailed perspective illustrating another form of the invention carried by the gear casing, and Fig. 5 is a detail perspective view illustrating the manner of securing the bearing in position.

Referring now in detail to the drawings, I have illustrated in Fig. 1 the top portion of an ice cream freezer which includes the body member indicated by the numeral 1 provided upon opposite sides thereof with the catch members 2 and 3. These catch members 2 and 3 are engaged by opposite ends of the cross-bar generally indicated by the numeral 4, one end of said cross-bar being engaged beneath the catch 2, while the other end of the bar is removably arranged beneath the catch 3. This cross-bar 4 includes the gear casing 5 and shaft bearing 6 and arranged within the gear casing and shaft bearing 6 the shaft 7 having a crank handle 8 attached to the outer end thereof for imparting movement to the same.

As stated in the objects of the invention, it is a well-known fact that in the operation of an ice cream freezer the operator has a tendency to impart a jerking motion to the same and in order to partially eliminate this motion and to steady the ice cream freezer, and thus make the work of turning the crank much easier than by having the jerking motion applied thereto, my improved handle member which is generally indicated by the numeral 9, is herein shown in the form of an angular bar, one end of which is integrally connected with the gear casing 5, while the other end thereof is integrally connected with the shaft bearing 6, thus providing a suitable handle which can be readily engaged by the operator and, at the same time, keep the hand of the operator from coming in contact with the ice or body of the freezer.

It is to be fully understood that while I have shown and described my improved handle member as integrally formed with the gear casing and bearing of the cross-bar 4, this handle member can be detachably connected to the several parts and serve the same purpose.

In Fig. 2, I have illustrated a slightly modified form of the invention wherein the handle member itself is shown as integrally formed with the hook portion or side piece which is attached to the top of the body of the freezer on the crank side thereof. The handle itself, which is indicated by the numeral 10, is integrally formed with the side portions of the member 11 through the medium of the converging arms 11 which are integrally formed with the side portions of the member 11 and extend upwardly to a converging point and integrally formed with the handle portion 10.

In Fig. 3, I have illustrated still another form of the invention, illustrating the handle member integrally formed with a different type of hook than that shown in Fig. 2. This type of hook includes a body plate 13 attached to the body of the freezer and having adjacent its upper end a perforation 14 to receive one end of the cross-bar 4 and further provided with a top cap 15 to which the handle member 16 is attached. The handle member 16, as illustrated in Fig. 3, is substantially T-shaped in form, the stem thereof being connected with the cap 15 while the cross-portion forms the handle grip for the hand of the operator.

In Fig. 4, I have illustrated another form of the invention and in this form I have illustrated a slightly different form of crossbar than that shown in Fig. 1. In this form of the cross-bar shown in Fig. 4, the shaft bearing 17 extends from the side of the body of the freezer to the gear casing 5 and integrally formed with the upper surface of the bearing 17 is an upright piece 18 having attached to the upper end thereof and extending transversely of the same is a hand grip 19 which can be readily grasped by the person operating the crank handle 8 to steady the freezer during the operation of the same.

In the drawings accompanying this description, I have illustrated several types of handle members adapted to be applied to an ice cream freezer, churn, or articles of the like character and it is to be understood that various other forms of handles and means for attaching the same to these articles can be used without departing from the scope of the invention. As stated heretofore, the main feature of the invention is the provision of a handle which is adapted to be attached to or integrally connected with an ice cream freezer or similar device, operated by a crank handle, said handle being attached to the device adjacent the crank handle whereby it may be readily grasped by the operator to steady the device during the operation and, at the same time, should the handle be attached to an ice cream freezer, the same will be in such a position as to keep the hand of the operator from coming in contact with the ice or body of the freezer.

What I claim is:

1. A device of the class described including a body member, a cross bar carried thereby, means for fastening the cross bar to the body member, a crank handle arranged adjacent the cross bar, and an auxiliary handle carried by the cross bar in close proximity to the crank handle.

2. In combination, a body member, a crank handle, means for supporting said crank handle in juxtaposition to the body, an auxiliary handle, and means for supporting said auxiliary handle adjacent the crank handle.

3. A device of the class described including a body member, a cross bar carried thereby, a bearing at one end of the cross bar, a gear cover intermediate with the ends of the cross bar, and an auxiliary handle having its ends attached to said gear cover and bearing.

In testimony whereof I affix my signature in presence of two witnesses.

WILLIAM M. NEYLAND.

Witnesses:
W. H. VON DAHLEN,
SOPHIE SEIDEL.